May 15, 1951 — W. AMES — 2,553,397
OPPOSED CONTACT DISTANCE MEASURE
Filed March 26, 1949 — 2 Sheets-Sheet 1
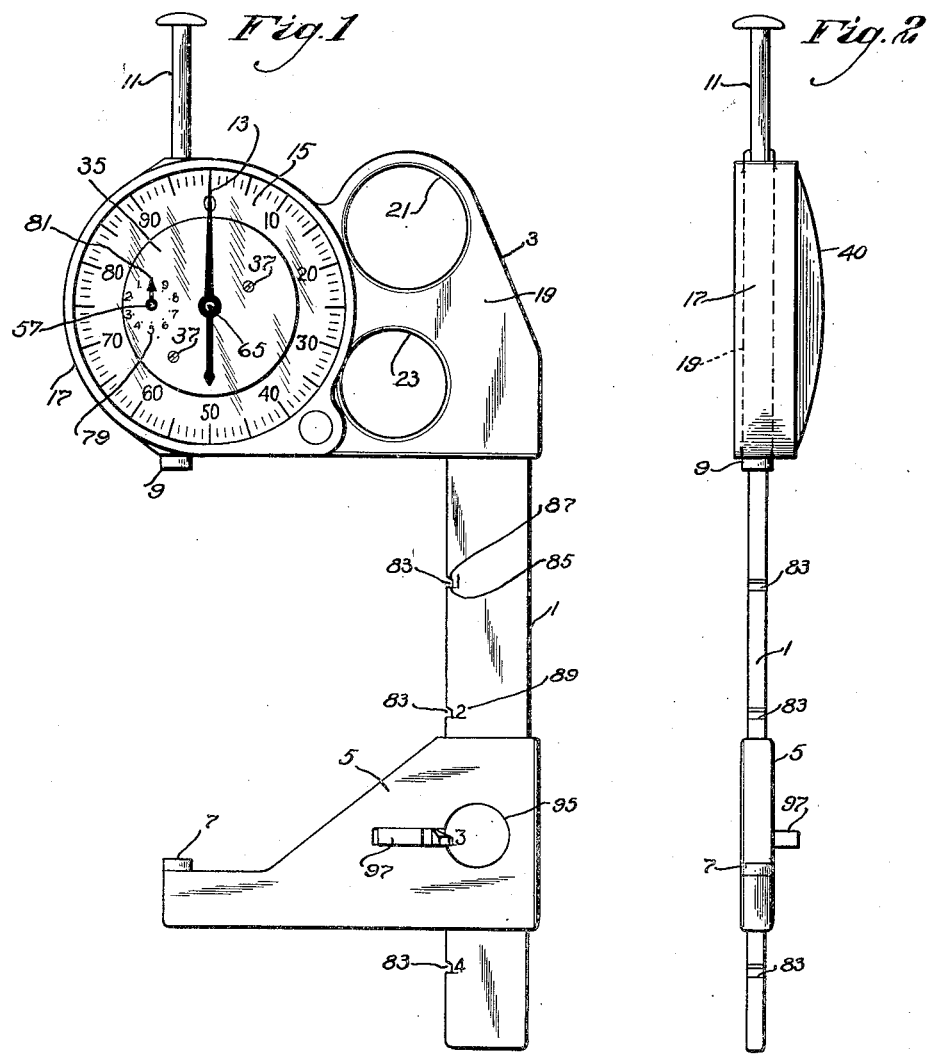
INVENTOR.
Warren Ames May 15, 1951 W. AMES 2,553,397
OPPOSED CONTACT DISTANCE MEASURE
Filed March 26, 1949 2 Sheets-Sheet 2
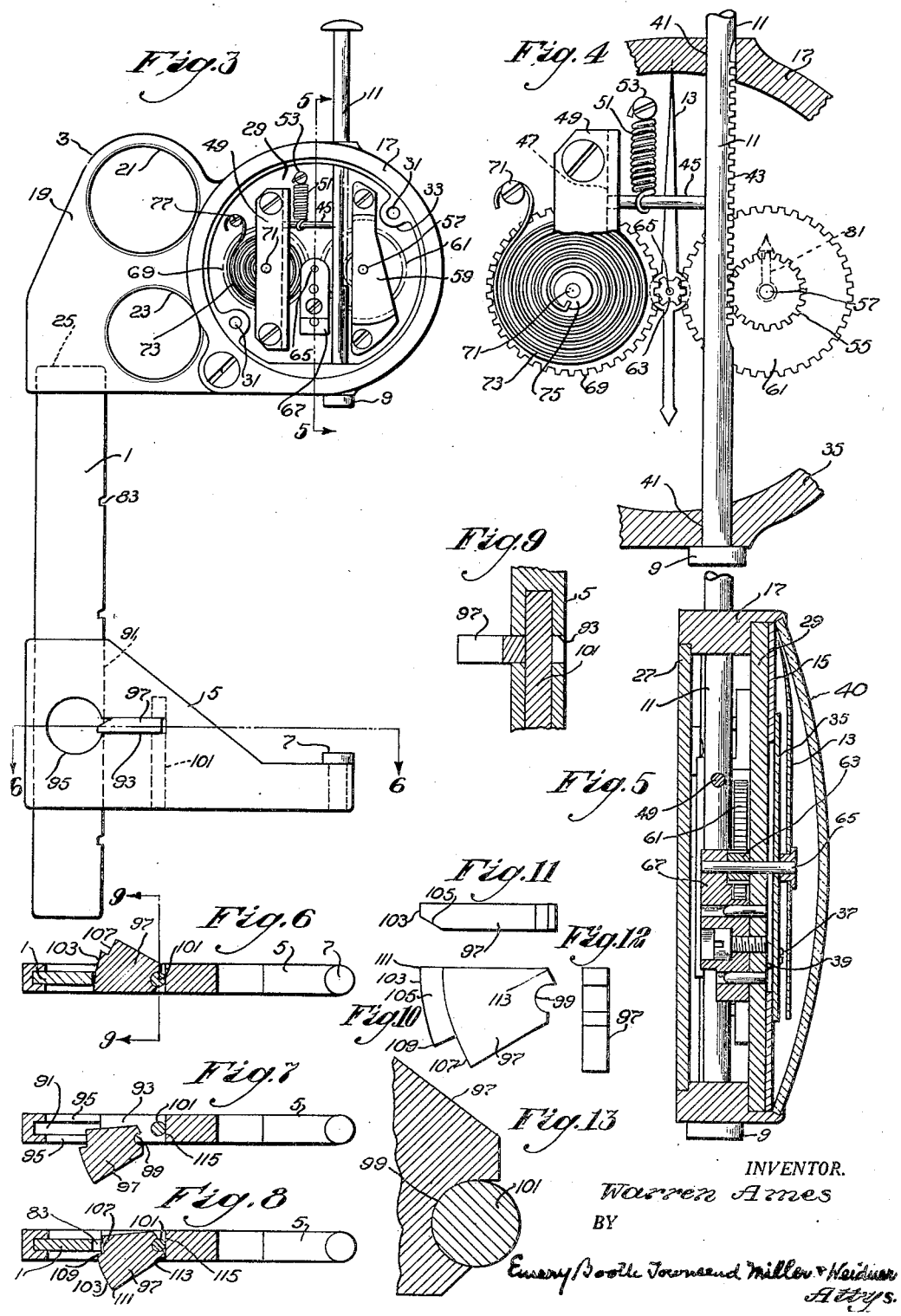
INVENTOR.
Warren Ames
BY
Emery Booth Townsend Miller & Weidner
Attys.

Patented May 15, 1951

2,553,397

UNITED STATES PATENT OFFICE 2,553,397

OPPOSED CONTACT DISTANCE MEASURE

Warren Ames, Newton, Mass., assignor to B. C. Ames Co., Waltham, Mass., a corporation of Massachusetts Application March 26, 1949, Serial No. 83,564

5 Claims. (Cl. 33—147)

My invention relates to distance measures, particularly one of the type in which the work is calipered between opposed work contacts carried by an elongated beam.

The invention will be best understood from the following description when read in the light of the accompanying drawings of an embodiment of the invention selected for illustrative purposes, while the scope of the invention will be more particularly pointed out in the appended claims.

In the drawings:

Fig. 1 is a front elevation of a distance measure according to the invention;

Fig. 2 is a side elevation of the distance measure according to Fig. 1 as viewed from the left;

Fig. 3 is an elevation of the distance measure according to Figs. 1 and 2 as viewed from its back, that is to say, according to Fig. 2 as viewed from the left of that figure, with the back plate of the dial micrometer gauge removed;

Fig. 4 is a more or less diagrammatic view of the gear mechanism of the dial micrometer gauge;

Figs. 5 and 6 are, respectively, sections on the lines 5—5 and 6—6 of Fig. 3, Fig. 5 being on an enlarged scale;

Fig. 7 is a more or less diagrammatic view corresponding to Fig. 6 illustrating the step in assembling and disassembling the parts;

Fig. 8 is a view corresponding to Fig. 6 showing the parts in a different operative position;

Fig. 9 is a section on the line 9—9 of Fig. 6 on an enlarged scale;

Fig. 10 is an elevation of the locking member according to Figs. 1, 3 and 6 on an enlarged scale;

Fig. 11 is a top view of the locking member according to Fig. 10;

Fig. 12 is an end view of the locking member according to Fig. 10 as viewed from the right of the latter; and Fig. 13 illustrates a detail on an enlarged scale.

As illustrated in the drawings, a beam or rod 1, of flat rectangular cross-section, fixedly carries at one end thereof a head 3, while slidably mounted on the rod for adjustment into predetermined positions along it is a head 5. The head 5 carries a work contact or anvil 7, while the head 3 carries a work contact 9, the latter being adapted to be moved toward the work contact 7 by a push rod 11 actuated by the operator. Movement of the push rod toward the work contact 7 operates the rotatable hand 13 cooperating with the graduated dial 15 of a dial micrometer gauge. By causing the heads 3 and 5 to embrace the work, with the contact 7 bearing against one side of it, the distance between that side and its opposite side may be measured by the operator pushing the rod 11 to cause the contact 9 to bear against said opposite side.

The dial micrometer gauge illustrated has a flat disk-like casing comprising a ring-like lateral portion or member 17 integrally provided with a flat lateral projection 19 having the two finger holes 21 and 23 for manual support of the measure. At its under edge portion the projection 19 is formed with a recess 25 (Fig. 3) into which the adjacent end of the rod 1 projects, the rod fitting the recess and being fixedly secured therein preferably by brazing.

As illustrated, the ring-like casing member 17 of the dial micrometer gauge is closed at one end by a flat back plate 27 (Fig. 5) and adjacent its opposite end by a front plate 29, these plates being secured to the member 17 by screws (not shown) which are tapped into holes 31 (Fig. 3) in the bosses 33 formed integrally with the inner wall of said member. The graduated dial 15 is in the form of a thin flat ring which rests against the front plate 29 and peripherally fits the adjacent inner annular wall of the member 17. The dial is held in assembled relation with the front plate by a thin flat disk-like member 35 which overlies it adjacent its inner periphery and is secured to the front plate by a pair of screws 37 (Figs. 1 and 5) tapped into bosses 39 (Fig. 5) on the outer face of the front plate. Overlying the dial 15 and indicator hand 13 is a crystal 40 carried by the member 17 at its end adjacent the front plate 29.

The push rod 11 extends through and is slidably mounted in perforations 41 (Fig. 4) in opposite side portions of the ring-like casing member 17 so as to be mounted for reciprocatory movement relative to said casing member. Interiorly of the casing the push rod is formed with rack teeth 43, and is prevented from axial rotation by a pin 45 fixedly carried at one end by said rod and projecting laterally therefrom, the opposite end of this pin being slidably received in a longitudinally extending slot 47 formed in the bridge-piece 49 carried by the front plate 29 of the dial micrometer gauge. A spring 51 under initial tension, and secured at one end to the pin 45 and at its opposite end to a screw 53 carried by the front plate, resiliently holds the push rod in its position shown by the drawings, that is to say, with the work contact 9 which forms an enlarged head on the push rod bearing against the under side of the member 17. When the push rod is moved by the operator downward from its position shown in Figs. 3 and 4, and then released, the spring 51 will return the rod to such position. The rack teeth 43 on the push rod mesh with a pinion 55 fixedly carried by a spindle 57 mounted at one end in the front plate 29 and at its opposite end in a bridge-piece 59 carried by said front plate. This spindle fixedly carries a gear 61 of larger diameter than the rack pinion 55, and with the gear meshes the center pinion 63 of the gauge. The center pinion is mounted on a spindle 65 to which it is fixedly secured. This last mentioned spindle has a bearing at one end in a block 67 carried by the front plate, and extends through the front plate, in which it has a bearing, and through the disk-like member 35 to project outward from the latter, the projecting pin carrying the indicator hand 13. The dial micrometer gauge also is shown as provided with a gear 69 which meshes with the center pinion and is fixedly carried by a spindle 71 rotatably mounted at one end in the bridge-piece 49 and at its opposite end in the front plate 29. A torsion hair spring 73 is shown as secured at one end to the hub 75 of the gear 69 and at its opposite end to a post or screw 77 carried by the front plate 29. The torsion spring is under initial tension and acts in opposition to the much stronger spring 51 so as to take up lost motion in the gear teeth of the train connecting the center pinion to the push rod.

As illustrated, the disk-like member 35 of the dial micrometer gauge is provided with the graduations 79 with which cooperates an indicator hand 81. This indicator hand is carried by the spindle 57 of the rack pinion 55, so that it rotates when the push rod 11 is moved. Preferably the gearing of the gauge is so designed that the indicator hand 81 moves one-tenth as fast as the indicator hand 13, so that a full revolution of the indicator hand 13 will correspond to one-tenth of a revolution of the indicator hand 81. Thus, assuming the graduations cooperating with the indicator hand 81 indicate a movement of one-tenth of an inch of the push rod, the graduations on the dial 15 will indicate one-thousandth of an inch movement of said rod.

One edge portion of the beam or rod 1 is shown as formed with notches 83, one lateral side 85 (Fig. 1) of each of these notches being at right angles to the adjacent edge of the rod and the opposite lateral side 87 being inclined to said edge so that the lateral sides of the notches converge toward each other as the bottoms of the notches are approached. Conveniently these notches are located at such distance apart as corresponds to one complete revolution of the indicator hand 81 of the dial micrometer gauge, these distances being, for example, one inch as indicated by the graduations 89 (Fig. 1) on said rod.

The slidable head 5 is shown as formed with an opening 91 (Figs. 3 and 7) which the rod 1 slidably fits. Intersecting one edge of this opening the head is shown as formed with a slot or recess 93 which opens on opposite sides of the head. Also the head is shown as formed at opposite sides of the opening 91 with circular openings 95 (Figs. 1, 3 and 7) one of which exposes the graduations on the rod, which graduations, in absence of such opening, would be covered by the head when positioned opposite them. These openings 95, for a reason which hereinafter will appear, form prolongations of the slot 93 and open into the opening 91.

Swingingly mounted in the slot 93 of the head 5 is a locking member 97 which is adapted to engage the notches 83 in the rod 1 for locking the head 5 in its adjusted positions along said rod. At one end the locking member is provided with a recess 99 which serves to fulcrum it on a pin 101 carried by the head 5 and intersecting the slot 93 at its end remote from the rod 1. The edge of the member 97 opposite the recess 99 has a portion 103 of arcuate shape which is beveled, as indicated at 105 (Figs. 10 and 11), for giving it a transverse cross-section complementary to that of the notches 83 in the rod 1. This same edge of the member 97 at one end thereof is notched for the radial width of the beveled portion thereof, as indicated at 107. The beveled arcuate edge portion 103 of the member is eccentric to the axis of the pin 101, the radius of curvature of such portion gradually increasing from its end 109 (Fig. 10) to its end 111 so that said portion forms a circular or arcuate wedge, with the result that when the member 97 is swung from its unlocked position shown by Fig. 8 to its locked position shown by Fig. 6 to enter the portion 103 thereof into a notch 83 on the rod 1 the member will tightly engage the notch to hold the head 5 rigidly to the bar. It will be observed that when the member 97 is in its unlocked position shown by Fig. 8 the notch 107 of that member is directly opposite the adjacent edge of the rod 1 and the portion 103 is out of the notch. This will permit the head 5 to be moved along the rod until the member 107 is opposite another notch, whereupon the operator may press the member 97 inwardly of the head 5 to cause the beveled edge 103 to enter the last mentioned notch and again lock the head to the rod.

The recess 99 in the member 97 is so shaped, as clearly indicated in Fig. 13, that when the member 97 is in its unlocked position shown by Fig. 8 and the rod 1 is withdrawn from the head 5, the member 97 will, as diagrammatically illustrated in Fig. 7, fall from the slot 93. The member 97 cannot fall from the slot 93, or be otherwise removed from the head 5, when all the parts are in their positions shown by Fig. 8 because the portion of that member at the notch 107, which notch is directly opposite a notch 83 in the rod 1, is unbeveled and therefore cannot move into the notch 83 or openings 95, and further because the member 97 cannot swing downward from its position shown in Fig. 8 because when in that position the corner 113 of the member will be in engagement with the left hand end wall 115 of the slot 93 receiving the member.

It will be observed that when the member 97 is in its locked position it projects from one side of the head 5 as shown by Figs. 2 and 6, and must be pressed inwardly of the head 5 to unlock the latter, the dial micrometer gauge being read from that side of the instrument, while the opposite side of the head 5 and corresponding sides of the rod 1 and dial micrometer gauge are flat. This enables the instrument to be laid upon a table or bench top, with these flat sides in contact therewith, without any possibility by so laying it of pressing the member 97 inward to unlock the head 5 from the rod 1.

It will be understood that within the scope of the appended claims wide deviations may be made from the form of the invention described without departing from the spirit of the invention.

I claim:

1. A distance measure having, in combination, an elongated rod carrying heads between which the work is calipered, one of said heads having an opening through which the rod extends for slidably mounting such head on said rod, said rod on one edge thereof being formed with spaced notches; the slidable head being formed, at that side of said rod which has said notches, with a slot transverse to said rod opening on each of opposite faces of said head and intersecting said opening; a plate-like locking member in said slot of greater thickness than the widths of said notches, means mounting said member in said slot for swinging movement at a point remote from said rod, said member having an arcuate edge adjacent the notched edge of said rod of greater length than the thickness of said slidable head between its opposite faces, which arcuate edge of said member has a laterally beveled radially projecting portion that is eccentric with respect to the axis of swinging of said member and extends longitudinally of said arcuate edge for part only of its length and is adapted to be received by and bind in said notches of said rod when said member is swung in one direction and to be removed from said notches when said member is swung in the opposite direction, the remaining portion of said edge of said member with respect to said projecting portion thereof cooperating with the notched edge of said rod for retaining said member within said slot when it is swung in one direction far enough to remove said projecting portion from said notches.

2. A distance measure having, in combination, an elongated rod carrying heads between which the work is calipered, one of said heads having an opening through which the rod extends for slidably mounting such head on said rod, said rod on one edge thereof being formed with spaced notches; the slidable head being formed, at that side of said rod which has said notches, with a slot transverse to said rod opening on each of opposite faces of said head and intersecting said opening; a plate-like locking member in said slot of greater thickness than the widths of said notches; means comprising a recess and a part received by said recess, one on said member and the other on said slidable head, for swingingly mounting said member within said slot at a point remote from said rod, which part is removable from said recess by sliding said member along said slot toward said opening in said slidable head; said member having an arcuate edge adjacent the notched edge of said rod of greater length than the thickness of said slidable head between its opposite faces, which arcuate edge of said member has a laterally beveled radially projecting portion that is eccentric with respect to the axis of swinging of said member and extends longitudinally of said arcuate edge for part only of its length and is adapted to be received by and bind in said notches of said rod when said member is swung in one direction and to be removed from said notches when said member is swung in the opposite direction; the remaining portion of said arcuate edge of said member with respect to said projecting portion thereof cooperating with the notched edge of the rod for holding in cooperating relation said part and recess, of said means for swingingly mounting said member, when said member is swung in one direction for removing said projecting portion of said edge of said member from said notches of said rod.

3. A distance measure having, in combination, an elongated rod carrying heads between which the work is calipered, one of said heads having an opening through which the rod extends for slidably mounting such head on said rod, said rod on one edge thereof being formed with spaced notches; the slidable head being formed, at that side of said rod which has said notches, with a slot transverse to said rod opening on each of opposite faces of said head and intersecting said opening; a plate-like locking member in said slot of greater thickness than the widths of said notches, which member at a portion thereof remote from said rod is formed with a notch; a part, fixedly carried by said slidable head within said slot, received by said notch of said member for mounting the latter for swinging movement, which part is removable from said notch by movement of said member along said slot toward said opening of said slidable head; said member having an arcuate edge adjacent the notched edge of said rod of greater length than the thickness of said slidable head between its opposite faces, which arcuate edge has a laterally beveled radially projecting portion that is eccentric with respect to the axis of swinging of said member and extends longitudinally of said arcuate edge for part only of its length and is adapted to be received by and bind in said notches of said rod when said member is swung in one direction and to be removed from said notches when said member is swung in the opposite direction, the remaining portion of said arcuate edge with respect to said projecting portion thereof cooperating with the notched edge of the rod for holding said notch of said member in cooperating relation with said part on which said member is swingingly mounted when said member is swung in one direction far enough to remove said projecting portion of said edge from said notches of said rod.

4. A distance measure according to claim 2 in which the radially projecting portion of the arcuate edge of the plate-like locking member extends angularly from one end of said arcuate edge part way toward its opposite end, the eccentricity of said projecting portion being such that it binds in the notches of the rod when said end of said arcuate edge from which said projecting portion angularly extends is substantially flush with the adjacent face of the slidable head.

5. A distance measure according to claim 1 in which the heads are plate-like members, the head opposite the slidable head forming a casing for an indicating micrometer gauge provided with a contact feeler extending toward the slidable head, the gauge having an index hand and a cooperating substantially flat graduated dial parallel to the faces of said heads, the swingingly mounted plate-like locking member carried by the slidable head being swingable in an upward direction to cause the radially projecting portion of the arcuate edge of said locking member to engage the notches of the rod when the measure is laid on a surface with said dial facing upward.

WARREN AMES.

REFERENCES CITED

The following references are of record in the file of this patent:

UNITED STATES PATENTS

| Number | Name | Date |
| --- | --- | --- |
| 251,662 | Webb | Dec. 27, 1881 |
| 833,477 | Nelson | Oct. 16, 1906 |
| 924,668 | Jaques | June 15, 1909 |
| 1,076,682 | Lucas | Oct. 28, 1913 |
| 1,823,045 | Hommel | Sept. 15, 1931 |
| 2,117,267 | Ames | May 17, 1938 |
| 2,117,268 | Ames | May 17, 1938 |
| 2,210,561 | Allen et al. | Aug. 6, 1940 |

FOREIGN PATENTS

| Number | Country | Date |
| --- | --- | --- |
| 238,706 | Switzerland | Nov. 16, 1945 |